United States Patent [19]

Wilkinson

[11] Patent Number: 5,771,446
[45] Date of Patent: Jun. 23, 1998

[54] ANTI-FRAUD CELLULAR SECURITY SYSTEM

[75] Inventor: Paul Wilkinson, Islip, N.Y.

[73] Assignee: Audiovox Corporation, Hauppauge, N.Y.

[21] Appl. No.: 494,317

[22] Filed: Jun. 23, 1995

[51] Int. Cl.6 .................................................. H04Q 7/00
[52] U.S. Cl. ........................... 455/410; 455/411; 380/23; 340/825.34
[58] Field of Search .............................. 380/23; 379/59, 379/58, 355, 356; 455/33.1, 410, 411, 455, 551, 564; 340/825.34, 825.31, 825.3, 825.35

[56] References Cited

U.S. PATENT DOCUMENTS

| | | | |
|---|---|---|---|
| 4,612,419 | 9/1986 | Smith | 379/200 |
| 5,179,719 | 1/1993 | Waldman | 379/356 |
| 5,343,519 | 8/1994 | Feldman | 379/355 |
| 5,384,825 | 1/1995 | Dillard et al. | 379/59 |
| 5,402,481 | 3/1995 | Waldman | 379/355 |
| 5,414,750 | 5/1995 | Bhagat et al. | 379/58 |
| 5,561,705 | 10/1996 | Allard et al. | 455/564 |
| 5,583,933 | 12/1996 | Mark | 379/355 |

Primary Examiner—Dwayne Bost
Assistant Examiner—Tracy M. Legree
Attorney, Agent, or Firm—Graham & James LLP

[57] ABSTRACT

A method and apparatus using a PIN number for preventing theft of cellular telephone service is disclosed. The PIN is requested silently by a visual display panel and entered silently by recalling the number from memory. The PIN number is transmitted as a hookflash message during each call at a limited, variable delay after the mobile unit switches to the voice channel and the cell site requests the PIN number by pressing a single key. This one-touch PIN transmission is also compatible with one-touch dialing, automated mail access, and linked number operations.

15 Claims, 4 Drawing Sheets

ANTI-FRAUD CELLULAR SECURITY SYSTEM

BACKGROUND OF THE INVENTION

1. Field of the Invention

The present invention relates to cellular telephone systems. In particular, the present invention relates to a method and apparatus for preventing theft of cellular telephone service.

2. Background of the Invention

Theft of cellular telephone service has reached epidemic proportions recently, affecting as much as 40% of the cellphone subscribers in some areas. Thieves obtain subscribers' access codes by electronically capturing the identification code containing the mobile unit's electronically-stored serial number (ESN) and its telephone number (#). The ESN/# numbers are broadcast by subscribers' mobile cellphone units as reverse wide-band data (RWBD) over the control channel assigned to each cellular phone base-station, the "cell site".

The control channel for each cell site carries all control signals that are transmitted between the mobile units in the area served by that cell site and the cell site, until an individual voice channel has been assigned to, and "seized" by, each mobile unit. This cellular phone control channel scheme is referred to as the common access system (CAS).

Each cell site serves a federally-allocated geographic area that has an assigned CAS control-channel frequency and, in some cases, even a specific signal coverage topology for the signal they broadcast, to prevent signal interference with other cell sites. Thus more than one CAS channel can be received in some locations. Among thieves, it has become common practice to monitor these CAS channels to capture the ESN/# data used in the theft of cellular telephone service.

The CAS that is presently in use in the United States allocates two carrier frequencies to each cell site for its control signals: one in the range of approximately 834–836 MHz for receiving transmissions from mobile units (R-CAS) and the other, in the range of 879–881 MHz, for broadcasting to the mobile units (F-CAS). Digital commands and control data communications are carried as FM modulation of the assigned CAS carrier frequencies. A limited repertoire of administrative messages are also supplied over the F-CAS channel using recorded or synthesized speech.

The voice channel assigned to a particular mobile unit is also a pair of FM modulated carrier frequencies. The frequencies are selected either from an "A" band below the CAS frequencies or from the "B" band above them, within the 822–847 MHz (RVC) and 867–893 MHz (FVC) ranges allocated by the FCC to common-carrier cellular telephone service, depending on the terms of the cell site's FCC license.

Each half of the assigned voice channel occupies 15 kHz on either side of the respective assigned carrier frequency. Within each 15 kHz half of the total FM carrier deviation, audio occupies the first band, between 300 Hz and 3 kHz, a Supervisory Audio Tone (SAT pilot tone) one between 5 kHz and 7 kHz, and digital Wide Band Data (WBD) one between 9 kHz and 11 kHz.

The cellphone operates in "ROAM" mode when outside the subscriber's "home" cellular telephone service area. While operating in ROAM mode, mobile cellular phone units scan the F-CAS band and respond to queries (REQ) from the one cell site that has the strongest CAS signal, the "local" cell site, by broadcasting their respective identification codes (ESN/#) on the R-CAS used by that local station, as shown in FIG. 1. In response to the local cell sites' REQ queries, the mobile unit's transmission of their ESN/# signals report their presence to the local cell site. The cell site then reports their presence to the network so that the network knows where to direct calls made to those phone numbers.

When one of those phone numbers is called, the cell site assigns a pair of carrier frequencies (FVC/RVC) to the mobile unit as its voice channel and directs the mobile unit to switch to that assigned channel. Similarly, a mobile unit's request for access to the network is initiated by dialing the phone number being called (CALL#). The CALL# dialed is then automatically transmitted to the local cell site over the CAS control channel, along with a copy of the ESN/# data as digital hookflash-format data when the subscriber presses the cellphone's transmit function key [SEND].

In response, the cell site broadcasts a voice-channel assignment (CH#) to that mobile unit, after verifying that the mobile unit's phone number belongs to a subscriber who is authorized by a cellular telephone service provider somewhere on the network, and that the mobile unit's ESN is registered to that authorized subscriber. The rest of the call takes place on the voice channel.

The assigned voice channel (FVC/RVC) is "seized" by the mobile unit after a channel acknowledge message (ACK) having a specified format is transmitted by the mobile unit as RWBD is received by the cell site. That particular ACK message format must be the first message received by the cell site, to confirm that the particular mobile unit now using the assigned voice channel is not some unknown third party.

This ACK message from the mobile unit in the RWBD portion of the RVC begins an all-digital, highly-interactive channel-control dialogue between the cell site and the mobile unit on the RWBD/FWBD portions of the assigned channel that protects the call's continuity and quality. This interactive dialogue "seizes" that particular voice channel, in that the "handshake" interaction routine carried on between the two RWBD/FWBD portions of the voice channel prevents outside interference. The data exchanged also provides signal-quality feedback and control that protects audio continuity until the mobile unit is passed on to the next "local" cell site, or until the call ends. The call may be ended either by a break in transmission that interrupts this dialogue, or by the subscriber pressing the [END] key to hang up.

This interactive RWBD/FWBD dialogue on the assigned voice channel is a complex stream of digital data messages 10 that are continuously, asynchronously exchanged between the cell site and the mobile unit. Each data message has a "frame" format that begins with an 11-bit presync burst (D) followed by a 12-bit sync word (S), as seen in FIG. 1a. That much is simple and predictable. However, this message header is then followed by a series of data words, A1, B1, A2, etc. The data words vary in length and the message frames in this interactive RWBD/FWBD stream have a variety of possible formats for sequencing those words, and include message formats which are proprietary to the service providers of the cellphone network.

FIG. 1 shows both the operation in accordance with invention and, in phantom, the conventional DTMF/PIN security code operation now in use by some cell sites. A four-digit personal identification number (PIN) is conventionally assigned to a subscriber's account when a theft of service from that account is suspected. Thereafter the PIN is requested by every cell site every time they receive a call initiated using the ESN/# data belonging to that subscriber, except for calls to emergency numbers and customer-service numbers provided by the network.

For security's sake, the PIN is sent by mail from the subscriber's cellular telephone service provider to the subscriber's billing address. In the conventional mobile units, this PIN must be entered on the mobile unit's dialing keys [KEYPAD] each time a call is placed. However, the CALL# and the PIN, or any other number entered using these keys [KEYPAD] are produced as audible dual-tone multi-frequency (DTMF) signals by the speaker 16 in the mobile unit, shown schematically in FIG. 2. Worse, after the mobile unit transmits ACK, all such [KEYPAD] entries are also transmitted as DTMF tones over the AUDIO portion of the RVC, as shown in phantom in FIG. 1, among with the signals picked up by the mobile unit's microphone 14.

The [KEYPAD] entries are transmitted on the voice channel so that they can be used to provide command signals or interactive responses, etc. during a call. However, this DTMF signal on the RVC inadvertently defeats the very purpose of the PIN, since DTMF decoders are inexpensive and DTMF/PIN signals on the RVC are clearly distinct, too easily detected to be secure.

In view of the poor security afforded by this conventional DTMF/PIN operation, some cell sites considered transmitting the PIN as additional RWBD signals before the voice channel is assigned, to prevent the DTMF signal from being transmitted by the mobile unit. However, this rapidly multiplies the data traffic on the CAS frequencies, overloading the CAS system. Also, the retrofitting of cell site hardware and software required to add PIN handling capability to existing CAS facilities is prohibitively expensive.

A further disadvantage of the DTMF/PIN operations that transmit the PIN using the same procedure as that used for dialing CALL# is that "link" operations, that is, convenient linkages of number entries that are needed after the call is connected cannot be used in the DTMF/PIN mode. In particular, linkages to stored numbers must be deactivated when conventional DTMF/PIN is in use because they preempt the DTMF/PIN. They transmit their own stored numbers after the called number is transmitted, when [SEND] is pressed a second time, at the very time when the cell site is waiting for the PIN to be transmitted. Similarly, automated MAIL operations often use the [SEND] key to step through the subscriber's voice-mail recordings, conflicting with DTMF/PIN.

SUMMARY OF THE INVENTION

In accordance with the present invention, a PIN number is electronically stored in the mobile unit. That PIN number is then sent as data over the voice channel seized by the mobile unit to authorize the cell site to connect the call.

In a preferred embodiment the PIN code can be transmitted as a digital hookflash at any time within 15 seconds after the PIN request signal is received by the mobile unit, after which the cell site produces a reminder signal, such as an audible "beep". Also, the PIN hookflash signal is transmitted by the mobile unit at most three times for each call, for the sake of security. Furthermore, because RVC hookflash transmission of the PIN is interactive, repeating each hookflash message until the hookflash word is correctly mirrored on the FVC, the entire PIN will rarely be repeated. If the RVC or FVC hookflash signal is too weak, the system will time out before the whole PIN is transmitted.

The PIN is transmitted by pressing a key that initiates a hookflash message, either the [SEND] key or a secondary function key. Transmitting the stored PIN only in the digitally-encoded asynchronously RWBD on the reverse voice channel (RVC) in response to a PINREQ signal on the AUDIO portion of the forward voice channel (FVC) channel hides the PIN in a dense thicket of digital data. In contrast, when the conventional DTMF/PIN is inadvertently broadcast on the AUDIO portion of the RVC as an easily-decoded DTMF signal, it stands out on the RVC like a bird perched on a telephone wire.

In a particular embodiment the PIN code is transmitted as a digital hookflash by pressing a function key on the mobile unit. Preferably, the PIN number is sent in response to a silent "PIN" display provided by the mobile unit.

Also, in a particular preferred embodiment, pressing the same key again one or more times after responding to the PINREQ signal automatically transmits additional number sequences that are stored in linked memory areas in the mobile unit that are associated with the called number.

Pressing the [SEND] key to transmit the stored PIN, rather than acknowledging the PINREQ by transmitting the PIN automatically, causes the PIN to appear at a variable delay after the ACK and the PIN request (PINREQ) signals were transmitted, making it even harder to detect and decode.

BRIEF DESCRIPTION OF THE DRAWINGS

The features and advantages of the present invention will be better understood when the detailed description of preferred embodiments provided below is considered in conjunction with the drawings, wherein:

FIG. 1a is a detail of one of the RWBD messages that is carried on the RVC in FIG. 1, showing a generalized digital message format;

FIG. 1b is a detail showing the structure of a hookflash word that might be one of the words shown in FIG. 1 and the generalized RWBD message format of FIG. 1a;

In these drawings, similar items have been assigned similar reference numerals.

DETAILED DESCRIPTION OF PREFERRED EMBODIMENTS.

Figure 2:
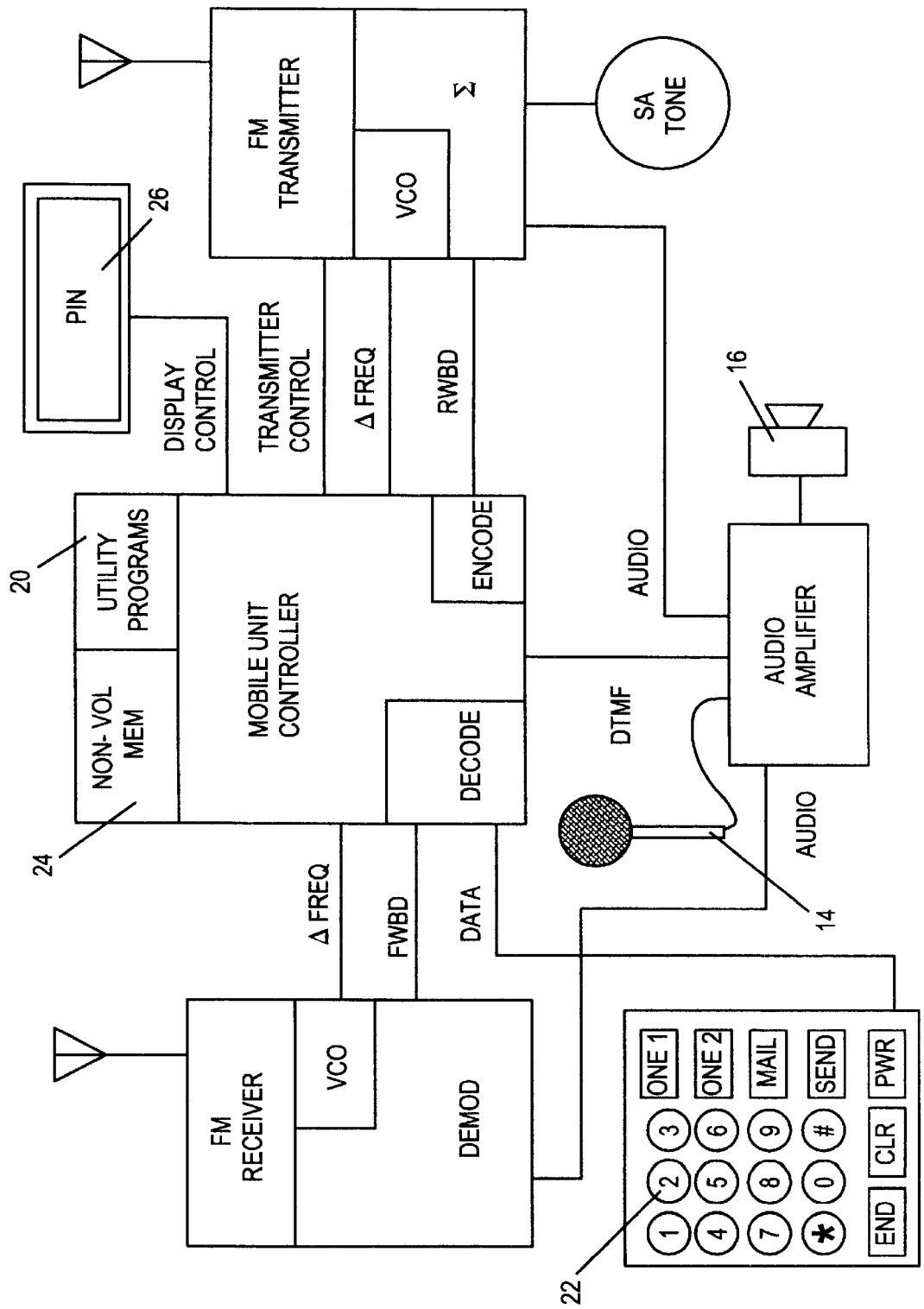
FIG. 2 is a schematic functional diagram of the mobile unit's transmitter and control circuitry.

In accordance with the present invention, the cellphone provides an automated PIN function so that the digits of the PIN number are entered by the subscriber only once, as soon as the PIN is received. In accordance with a preferred embodiment of the present invention, this entry is made using the utility programs 20 that provide the mobile cellphone unit's "programming" mode operations. Programming mode is accessed by entering the subscriber's own unique cellphone locking code and certain programming command codes prescribed by the manufacturer on the keys [KEYPAD] of the mobile unit's dialing keypad 22, shown in FIG. 2. The PIN is then entered into a non-volatile memory device 24, such as an $E^2$PROM, using the keys [KEYPAD] of the dialing keypad 22.

Thereafter, the PIN can be silently recalled from memory each time it is requested by an alphanumeric display 26. In this way the procedure required by the cellphone's "PIN mode" of operation is transparent to all users. Moreover, the PIN number is invisible to all who use that particular cellphone, as well as passersby, unless the mobile unit's memory module is accessed using the subscriber's unique cellphone security/locking code determined by the mobile unit's own utility programs 20.

More important, transmitting the STORED/PIN from memory 22 is a silent operation. After the mobile unit automatically sends its ACK as an RWBD signal, it sends all [KEYPAD] entries to the cell site as clear, audio DTMF signals on the AUDIO portion of the RVC. However, in accordance with the invention the stored PIN is programmed-in when the mobile unit is not transmitting audio signals, rather than being dialed-in during a call. Therefore the STORED/PIN never appears in those broadcast DTMF signals.

Moreover, because of the nature of the dialogue that is used to seize the voice channel for the sole use of a particular mobile unit, the STORED/PIN that is transmitted is interspersed within a thicket of complex interactive message formats on the RWBD portion of the RVC. There it is repeatedly transmitted, one digit at a time, until each digit is acknowledged on the FVC. This causes the PIN carried as RWBD on the RVC to be effectively invisible to third parties.

Figure 3A:
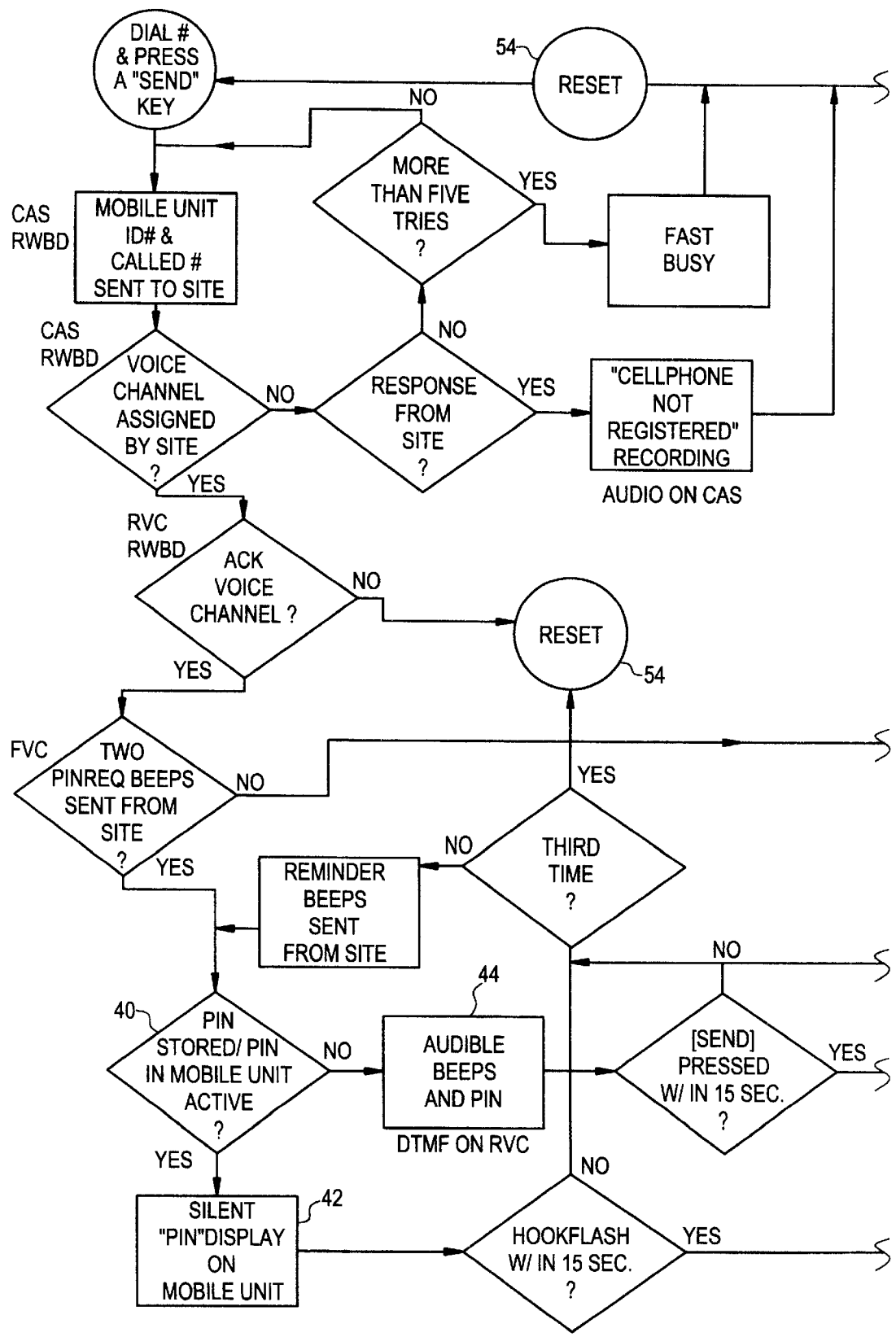
FIG. 3 is a logic flow chart showing the implementation of dialing options in a PIN security system in accordance with the present invention.
Figure 3B:
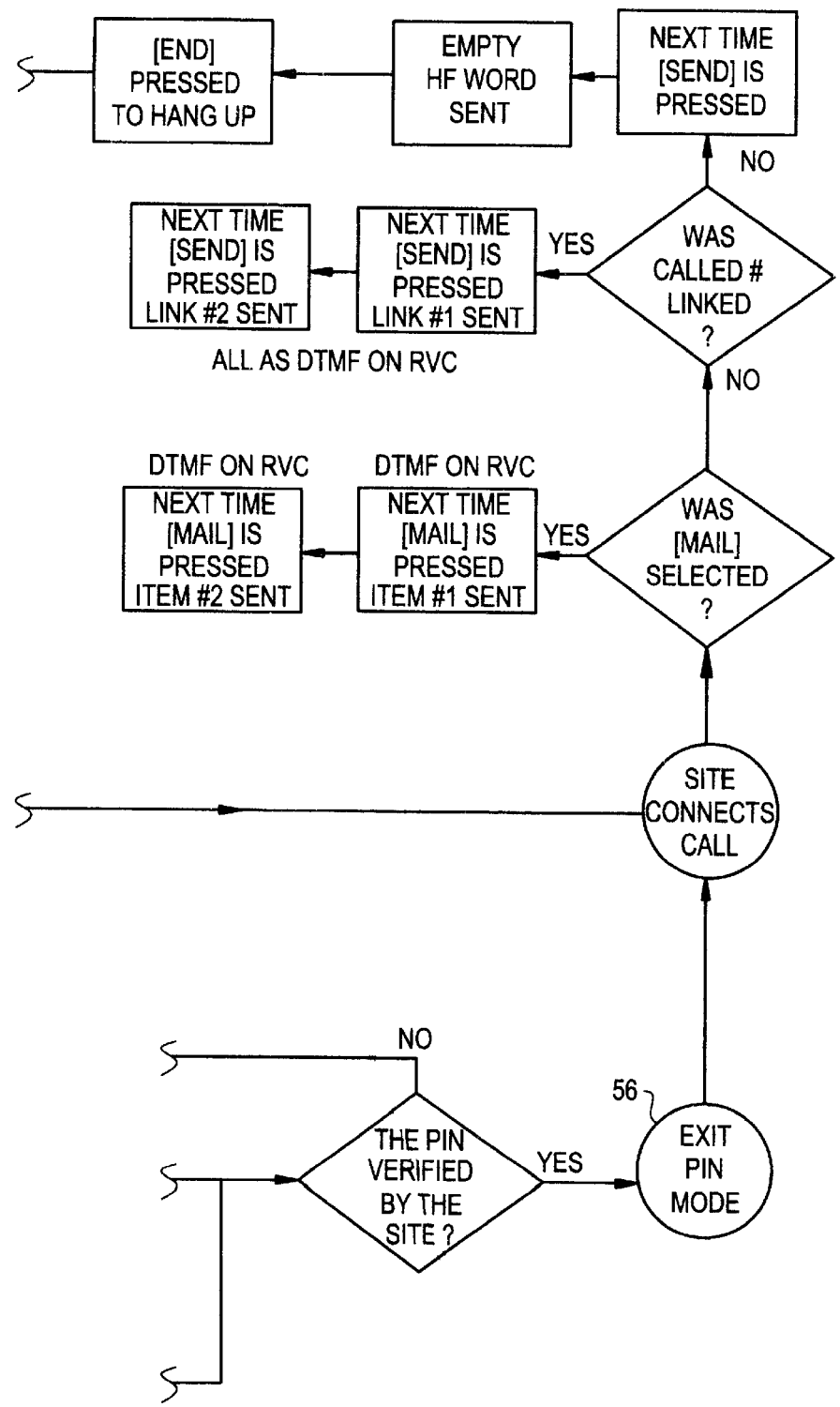

When a local cell site receives an access request from a mobile unit that is operating in ROAM mode, outside its home area, the local cell site first checks the subscriber's service provider's authorization requirements for the call. If the service provider requires a PIN from that subscriber, the local cell site conventionally transmits a DTMF two-beep PIN request signal (PINREQ) to the mobile unit over the FVC, as shown in FIG. 3.

In accordance with a presently preferred embodiment of the present invention, the mobile unit then determines whether the STORED/PIN mode has been activated 40. If the PIN mode is active, the "PIN" display 42 appears, otherwise the mobile unit simply beeps twice 44 and waits 15 seconds for a hookflash signal to be transmitted by the subscriber.

When PIN mode is active, all the subscriber ever needs to do to initiate a call is to key in the called number (CALL#) normally and press [SEND]. When [SEND] is pressed the first time, the mobile unit broadcasts CAS hookflash message frames containing that CALL# and the ESN/# of the mobile unit making the call. Then, if a PIN is required the mobile unit silently displays the legend "PIN" 42, rather than sounding the conventional two DTMF beeps 44. The word "PIN" appears on a visual display 26, to explicitly remind the caller that PIN authorization is required by the subscriber's home service provider, without the usual noisy fanfare.

Figure 1:
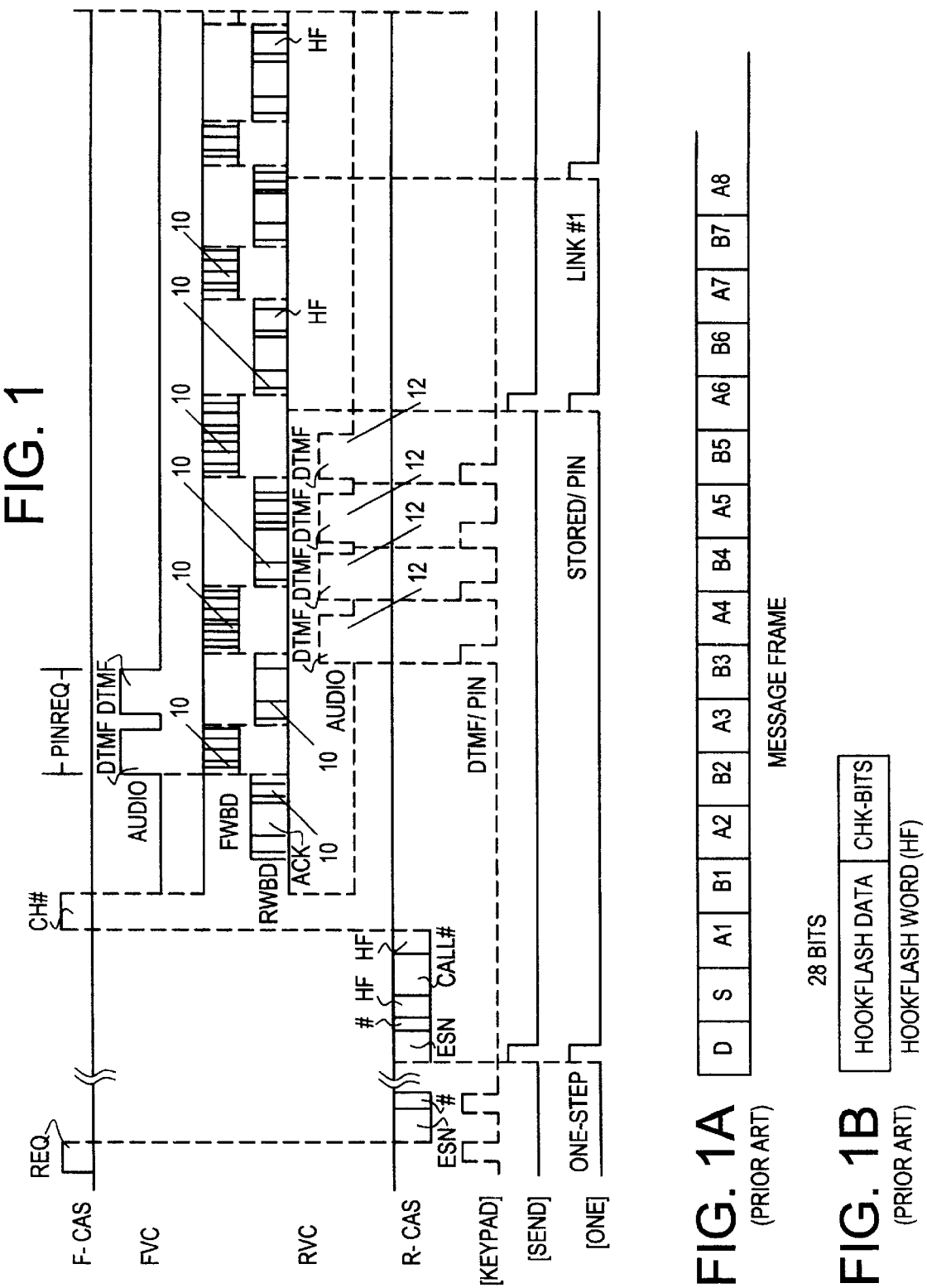
FIG. 1 is a schematic representation of the FWBD and RWBD signals carried on CAS and FVC/RVC channels operated in accordance with a preferred embodiment of the present invention, with prior art DTMF/PIN operation indicated in phantom.

Hookflash message frame signals are formatted by conventional mobile units and inserted into the simpler CAS RWBD/FWBD data stream every time the [SEND] key is pressed to transmit a dialed number, as shown in FIG. 1. Mobile units transmit hookflash message frames over either the CAS or the voice channel, whichever is currently in use by the mobile unit.

The hookflash message frame is simply a particular digital message format that contains a hookflash data word (HF). The HF words each contain 28 data bits and parity-check bits, as shown in FIG. 1b. Thus, each HF word provides only a portion of the mobile unit's ESN/# or the number being called by the mobile unit, one digit, for example. The HF words in a sequence of hookflash message frames transmitted by the mobile unit may also include null data, particularly if a hookflash message is initiated when no called number, PIN number or other data has been entered. Preferably, at the caller's option, the hookflash messages can be transmitted by pressing the [SEND] key or by pressing one other function keys such as one of the dedicated one-step speed-calling keys [ONE] that have become a familiar convenience feature on telephones of all kinds.

On the assigned voice channels, each HF message frame received by the cell site is retransmitted one or more times for verification by the respective mobile unit. The mobile unit then will retransmit that hookflash message frame to the cell site, if necessary, before transmitting the next portion of the data to the cell site in another HF frame.

If the whole PIN that finally was received by the cell site is valid, the cell site connects the call to the cellular network and exits the PIN mode 56 until the call ends. If the subscriber fails to transmit a hookflash message within 15 sec. after the "PIN" request appears on the display 26 and this is not yet the third try 48, the cell site sounds two audible beeps 50 to alert the subscriber and, if STORED/PIN mode is active, the "PIN" display 42 appears again.

On the other hand, after a third failure 48 to transmit a hookflash, or verify the PIN that was received 52, the system resets 54 and releases the voice channel, terminating that call.

Mobile units in accordance with the present invention are well-adapted to the use of speed-dialing automation features, and permit free use of secondary operations including secondary linked number sequences, as soon as the mobile unit exits the PIN mode 56.

Because the STORED/PIN is transmitted using whichever one key of the various function keys that is convenient, the STORED/PIN operation of these mobile units is as convenient to use as one that automatically transmits the PIN, regardless of what function is selected. Conventional cellphones, however, require that the secondary operation available for such functions be deactivated when the PIN is in use, as noted above.

In mobile units that provide "one-touch" dialing, the speed-dialing key [ONE] that accesses the desired stored number is pressed. The [ONE] key must be pressed again in response to the PINREQ to supply the necessary PIN number. Thus "one-touch" is, actually, two-touch dialing when STORED/PIN security is in use. However, entering the PIN for each call would be not only more of a nuisance, but more insecure. Similarly, a [MAIL] key is conventionally provided to automatically dial a voice-mail service. Pressing the [MAIL] key again then steps through the recorded messages stored for that subscriber.

The STORED/PIN defers these secondary, linked operations, preventing the conventional DTMF/PIN conflicts. In these conflicts, after the [SEND] key or [ONE] key or [MAIL] key, or whatever other function key initiated the call is pressed, the first linked hookflash message transmitted pre-empts the PIN or, if the function retrieves a stored, linked number, the linked number may interrupt or otherwise interfere with the transmission of the PIN.

Thus, in the interest of driver safety and customer convenience, STORED/PIN mobile units in accordance with the present invention simplify cellphone dialing procedures in two ways:

1) They prevent conflict with and preemption of the PIN by secondary functions.

2) The PIN can be accessed by merely pressing the same, respective automated-function key one extra time.

The STORED/PIN mobile units also increase the capital cost and decease the productivity of the thief's PIN-capture efforts. The PIN is transmitted at a variable delay interval after the PINREQ and ACK, rather than automating the PIN. The STORED/PIN is also transmitted as only one digit of the PIN in each of a sequence of hookflash frames, so that it is obscured by the cluttered RWBD/FWBD stream, as already explained. The messages in which each digit of the PIN is transmitted are also interspersed with repeated hook-flash message frames which further obscure the PIN.

Specifically, in accordance with the present invention, the standard voice-channel quality control operations of the cell site hide the transmitted PIN. The data message verification transmissions repeat all messages on the RVC and FVC a variable number of times to assure their accurate reception before transmitting any other messages. As it happens, the RWBD and FWBD portions of the voice channel also carry non-PIN hookflash messages, even null hookflash data frames. A host of other message frame formats, including proprietary channel control and administration message frames, also obscure the PIN number.

These inherent complexities of the RWBD/FWBD message stream appearing on the standard cellular telephone service voice channels become newly advantageous when used in accordance with the present invention as a hiding place for the STORED/PIN, not just for administrative and quality-control communications. As they are used in the STORED/PIN mobile unit's operation, they make the subsequent retransmission of a hookflash frames captured during a previous cellphone call utterly useless for obtaining authorization.

STORED/PIN capture also requires equipment that is more complex than DTMF signal capture equipment. DTMF capture requires monitoring the F-CAS for voice channel assignments and the individual RVC for DTMF/PIN traffic. No synchronization lock is needed because no decode is required. The DTMF can be simply recorded. However, data synchronization critical to decoding RWBD traffic to detect the PIN among the repeated and varied data messages carried on the RVC and that data synchrony is not based on a fixed interval, it is interactive. Therefore the capture equipment must also monitor the FWBD of the voice channel in order to maintain the data synchronization needed to decode the digital RWBD message frames on the RVC that contain hookflash words.

Thus, in particular, the interactive design of the STORED/PIN in the present invention provides two levels of additional security:

1) Pressing a key to transmit the stored PIN causes the PIN to appear at a variable delay after the digital ACK and the PINREQ signals appear on respective portions of the voice channel.

2) Since the messages in both directions vary in length and are sent interactively, asynchronously, the thief cannot reliably maintain the necessary data synchronization if only RVC data from the mobile unit is monitored. These features make thieves' attempts at a STORED/PIN capture operation inherently much more expensive and uncertain than the conventional CAS capture or a DTMF/PIN capture operation.

The invention has been described with particular reference to the presently-preferred embodiments of the invention. It will be apparent to one skilled in the art that modifications and variations are possible within the spirit and scope of this invention. For example, the PIN could be mailed on a magnetically-coded card and entered into the mobile unit's non-volatile memory without being keyed in. The invention is defined by the appended claims.

I claim:

1. A method for preventing theft of cellular telephone service by using a PIN number to authorize each call, said service being provided by a cell site to a subscriber's mobile unit, said service including data having a digital message format, said method comprising the steps of:
   storing the PIN number in the mobile unit;
   seizing a voice channel for a call; and
   pressing a key to retrieve said stored PIN number and transmit said stored PIN number on said voice channel as digital data having a message format such that said digital data is combined with a group of interactive message format data on a reverse wide band data format to securely transmit the PIN number to the cell site.

2. The method of claim 1 wherein said PIN data has a hookflash message format and said PIN data is transmitted one digit at a time until all digits of said PIN data are acknowledged by the cell site.

3. The method of claim 1 wherein said PIN number is stored in the mobile unit using a programming mode wherein no numbers entered at the mobile unit are transmitted to the cell site.

4. The method of claim 1 wherein said PIN number is retrieved in response to a visual display provided on the mobile unit that requests the PIN number.

5. The method of claim 1 further comprising the step of:
   pressing said key on the mobile unit so as to transmit a called number before seizing said voice channel,
   and wherein said key on the mobile unit is pressed again in response to the PIN request signal so as to retrieve and transmit said PIN number in a digital message format.

6. The method of claim 5 further comprising the step of:
   pressing said key on the mobile unit a third time to transmit a number sequence that is linked with the called number, whereby link-function operations are implemented in a manner compatible with the use of PIN security procedures.

7. The method of claim 5 further comprising the steps of:
   pressing said key at least one more time after transmitting the PIN number, so as to provide a further secondary function operation.

8. The method of claim 1, wherein said key is a SEND key of the mobile unit, the method further comprising the step of activating a PIN mode of the mobile unit so that the PIN number stored in the mobile unit is automatically transmitted in response to said SEND key being pressed when sending a telephone number entered on the mobile unit to the base station.

9. Mobile cellular telephone apparatus for preventing theft of cellular telephone service by using a PIN number to authorize each call, said service including data having a digital message format, said service being provided by a cell site to a subscriber's mobile apparatus, said apparatus comprising:
   non-volatile memory for storing the PIN number;
   a transducer for entering the PIN number into the apparatus, said transducer being connected for storing the PIN number entered into the apparatus in said non-volatile memory; and
   a key, said key being connected to retrieve said stored PIN and transmit said stored PIN number as data in a digital message format on a voice channel when said key is pressed after said voice channel has been seized for a call such that said digital data is combined with a group of interactive message format data on a reverse wide band data format to securely transmit the PIN number to the cell site.

10. The mobile cellular phone apparatus of claim 9 further comprising:

a send key connected to transmit a called number when the send key is pressed, and wherein said PIN number is transmitted as data having a hookflash digital message format, such as the digital message format transmitted by pressing the send key.

11. The mobile cellular phone apparatus of claim 9 wherein said transducer further comprises:

a controller, said controller providing a programming mode for said apparatus such that no numbers entered into the apparatus in said programming mode are transmitted to the cell site, said transducer being connected so as to store said PIN number in said non-volatile memory using said programming mode.

12. The mobile cellular phone apparatus of claim 9 further comprising:

non-volatile speed-dialing memory for storing telephone numbers to be called, and wherein pressing said key transmits a called telephone number before said voice channel is seized, and pressing said key again after said voice channel is seized retrieves and transmits said PIN number in a digital message format.

13. The mobile cellular phone apparatus of claim 9 further comprising:

link memory for storing linked numbers, said link memory providing storage for data items linked to numbers to be called, and wherein pressing said key again, after pressing said key to transmit said PIN number, transmits a linked number, whereby link-function operations are implemented in a manner compatible with the use of PIN security procedures.

14. The mobile cellular phone apparatus of claim 9 wherein said key is a secondary function key, and pressing said secondary function key at least one more time after transmitting the PIN number provides a further secondary function operation.

15. The mobile cellular phone apparatus of claim 8, wherein said key is a SEND key of the mobile unit, the apparatus having a PIN mode of operation in which the PIN number stored in the mobile unit is automatically transmitted in response to said SEND key being pressed when sending a telephone number entered on the mobile unit to the base station.

* * * * *